(12) United States Patent
Kwon

(10) Patent No.: US 8,024,017 B2
(45) Date of Patent: Sep. 20, 2011

(54) SLIDABLE MOBILE TERMINAL HAVING A SLIDE MODULE

(75) Inventor: Soon-Sung Kwon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 647 days.

(21) Appl. No.: 12/105,044

(22) Filed: Apr. 17, 2008

(65) Prior Publication Data

US 2008/0261665 A1 Oct. 23, 2008

(30) Foreign Application Priority Data

Apr. 18, 2007 (KR) ........................ 10-2007-0038058

(51) Int. Cl.
*H04W 88/02* (2009.01)
*H04B 1/08* (2006.01)
*H04M 1/02* (2006.01)

(52) U.S. Cl. .................................................. 455/575.4

(58) Field of Classification Search ................. 455/575.4
See application file for complete search history.

(56) References Cited

U.S. PATENT DOCUMENTS

| 6,980,840 B2 * | 12/2005 | Kim et al. .................. 455/575.4 |
| 7,076,058 B2 * | 7/2006 | Ikeuchi et al. ......... 455/575.4 X |
| 7,512,427 B2 * | 3/2009 | Finke-Anlauff et al. ..................... 455/575.4 X |
| 7,636,592 B2 * | 12/2009 | Kim et al. .................. 455/575.4 |
| 2005/0113155 A1 * | 5/2005 | Kim et al. .................. 455/575.4 |

* cited by examiner

*Primary Examiner* — Philip Sobutka
(74) *Attorney, Agent, or Firm* — Birch Stewart Kolasch & Birch, LLP

(57) ABSTRACT

A slidable mobile terminal including a first body having a first surface and a second surface, a second body having a first surface and a second surface, the first body being movable with respect to the second body between a closed position where the first body substantially overlaps the second body and an open position where the first body partially overlaps the second body, is provided. The slidable mobile terminal also includes a slide module connecting the second surface of the first body to the first surface of the second body, thereby allowing the first body to move between the closed position and the open position in a sliding direction. A manipulation unit is located in the first surface of the second body and is exposed when the first body is in the open position. The manipulation unit does not overlap the slide module in the closed position.

4 Claims, 5 Drawing Sheets

SLIDABLE MOBILE TERMINAL HAVING A SLIDE MODULE

CROSS-REFERENCE TO RELATED APPLICATIONS

This application claims priority to Korean Application No. 10-2007-0038058, filed Apr. 18, 2007, which is herein incorporated by reference in its entirety.

BACKGROUND OF THE INVENTION

1. Field of the Invention

The present invention relates generally to a mobile terminal, and more particularly, to a slidable mobile terminal having a pair of bodies that are slidably connected and includes at least one manipulation unit that is operable by user manipulation on one portion of the slidable mobile terminal that is selectively exposed by a sliding operation.

2. Description of Related Art

A mobile terminal is a device that can be carried around and has one or more functions, such as voice and video call communication, inputting and outputting information, storing data, and the like. As the functions of the mobile terminal have become more diversified, the mobile terminal has been implemented in the form of a multimedia player supporting more complicated functions, such as capturing images or video, reproducing music or video files, playing games, receiving broadcast signals, and the like.

In order to implement various functions of such multimedia players or devices, numerous improvements to hardware or software have been implemented. For example, a user interface allowing users to easily and conveniently search for and select one or more functions is provided. While the development of such user interface environments is occurring, portability of the mobile terminal should not be degraded as consumers still prefer smaller players or devices.

BRIEF SUMMARY OF THE INVENTION

According to principles of the present invention, a slidable mobile terminal is provided that is configured to provide a thinner device by arranging the slide module and a manipulation unit to be substantially planar to each other such that the slide module and manipulation unit do not overlap each other.

In accordance with the present invention, a slidable mobile terminal including a first body having a first surface and a second surface, a second body having a first surface and a second surface, the first body being movable with respect to the second body between a closed position where the first body substantially overlaps the second body and an open position where the first body partially overlaps the second body, is provided. The slidable mobile terminal also includes a slide module connecting the second surface of the first body to the first surface of the second body, thereby allowing the first body to move between the closed position and the open position in a sliding direction. A manipulation unit is located in the first surface of the second body and is exposed when the first body is in the open position. The manipulation unit does not overlap the slide module in the closed position.

In accordance with the another aspect of the present invention, a slidable mobile terminal including a first body, a second body slidably connected to the first body, the first and second bodies having opposing surfaces that face each other, a keypad located on one of the opposing surfaces of first and second bodies, and a slide module that slidably connects the first and second bodies, is provided. The slide module is located such that the slide module does not overlap with the keypad in a state that the first and second bodies substantially overlap each other.

Further scope of applicability of the present application will become more apparent from the detailed description given hereinafter. However, it should be understood that the detailed description and specific examples, while indicating preferred embodiments of the invention, are given by way of illustration only, because various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
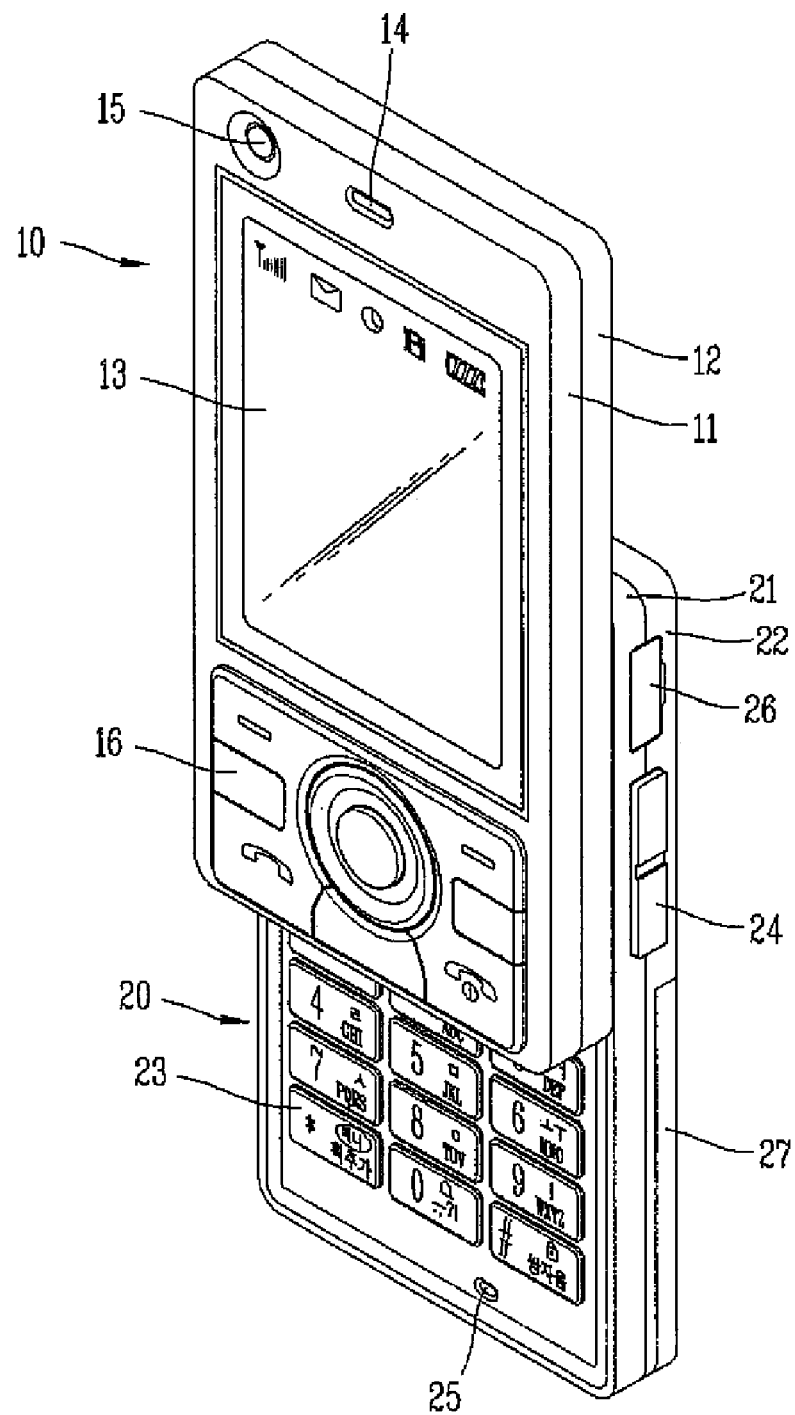
FIG. 1 is a front perspective view of a slidable mobile terminal according to an exemplary embodiment of the present invention.

The mobile terminal according to exemplary embodiments of the present invention will now be described with reference to the accompanying drawings. In the following description, the same reference numerals are used for the same or like elements in different embodiments and a corresponding detailed explanation will be omitted merely for the sake of convenience.

FIG. 1 is a front perspective view of a slidable mobile terminal according to an exemplary embodiment of the present invention. As shown in FIG. 1, the mobile terminal according to the present invention includes a first body 10 and a second body 20 formed to be slidably moved along at least one direction on the first body 10. The first and second bodes 10 and 20 may be referred to as a main body of the slidable mobile terminal. A state in which the first body 10 is disposed to overlap with the second body 20 may be called a closed configuration (see FIG. 3), and as shown in FIG. 1, a state in which the first body 10 exposes at least a portion of the second body 20 may be called an open configuration. In the closed configuration, the mobile terminal may operate in a standby mode (idle mode), and the standby mode may be released according to a user manipulation. In this exemplary embodiment, the mobile terminal operates mainly in a calling mode or the like in the open configuration, and it can be changed to the standby mode according to a user manipulation or with the lapse of a certain time.

The case, which may also be referred to as a casing, a housing, a cover, or the like, forming the external appearance of the first body 10 includes a front case 11 and a rear case 12. The front case 11 and rear case 12 define first and second surfaces, respectively, of the first body 10. Various electronic components are installed in the space between the front case 11 and the rear case 12. In addition, one or more intermediate cases may be disposed between the front case 11 and the rear case 12 to further define the space between the front case 11 and the rear case 12. The cases may be formed by injection-molding a synthetic resin or may be made of a metallic material, e.g., stainless steel (STS) or titanium (Ti), or the like.

The front case 11 of the mobile terminal includes a display 13, an audio output unit 14, a first image input unit 15, and a first manipulating unit 16 located thereon. The display unit 13 may be a Liquid Crystal Display (LCD) module or an Organic Light Emitting Diode (OLED) module, or other similar displays that visually displays information. The display unit 13 may further include a touch screen to allow inputting of information in a touch manner by the user. The audio output unit 14 may be implemented as a receiver or a speaker. The first image input unit 15 may be implemented in the form of a camera module for capturing an image or video of the user, and so on. The first manipulating unit 16 is configured to receive commands for controlling an operation of the mobile terminal by manipulation of the first manipulating unit 16.

Similar to the first body 10, the second body 20 also includes a front case 21 and a rear case 22. The front case 21 and rear case 22 define first and second surfaces, respectively, of the second body 20. A second manipulating unit 23 is disposed on the second body 20, particularly, on a front face of the front case 21. A third manipulation unit 24, a first audio input unit 25, and an interface 26 are disposed on at least one of the front case 21 and the rear case 22. The first audio input unit 25 may be implemented in the form of, for example, a microphone to receive a voice of the user or other sounds, or the like.

The first to third manipulating units 16, 23 and 24 may be generally called a manipulation portion, and any means can be employed as the manipulating units so long as they can be operated in a tactile manner. For example, the manipulating units may be implemented as a dome switch, a wheel or jog type for rotating a key, a joystick, or a touch screen or a touch pad that can receive a command or information according to a pressing or a touch operation by the user in terms of function, the first manipulating unit 16 may be used to input a command such as start, end or scroll, or the like, and the second manipulating unit 23 may be used to input a number, a character, or a symbol. The third manipulating unit 24 may operated as a hot key for performing a special function such as activating the first image input unit 15.

The interface 26 may be used as a passage, path, or link allowing the mobile terminal to exchange data with an external device. For example, the interface 26 may be at least one of a connection port to be connected with an earphone, a port for short range communication (e.g., an IrDA port, a BLUETOOTH port, a wireless LAN port, or the like). The interface 26 may be a card socket for receiving/accommodating an external card such as a Subscriber Identification Module (SIM), a User Identity Module (UIM), a memory card for storing information, or the like. The interface may also be used as a power supply port for supplying power to the mobile terminal.

A power supply unit 27 may be mounted at the side of the rear case 22 in order to supply power to the mobile terminal. The power supply unit 27 may be, for example, a rechargeable battery which can be detachable to allow for charging of the battery independent of the mobile terminal.

Figure 2:
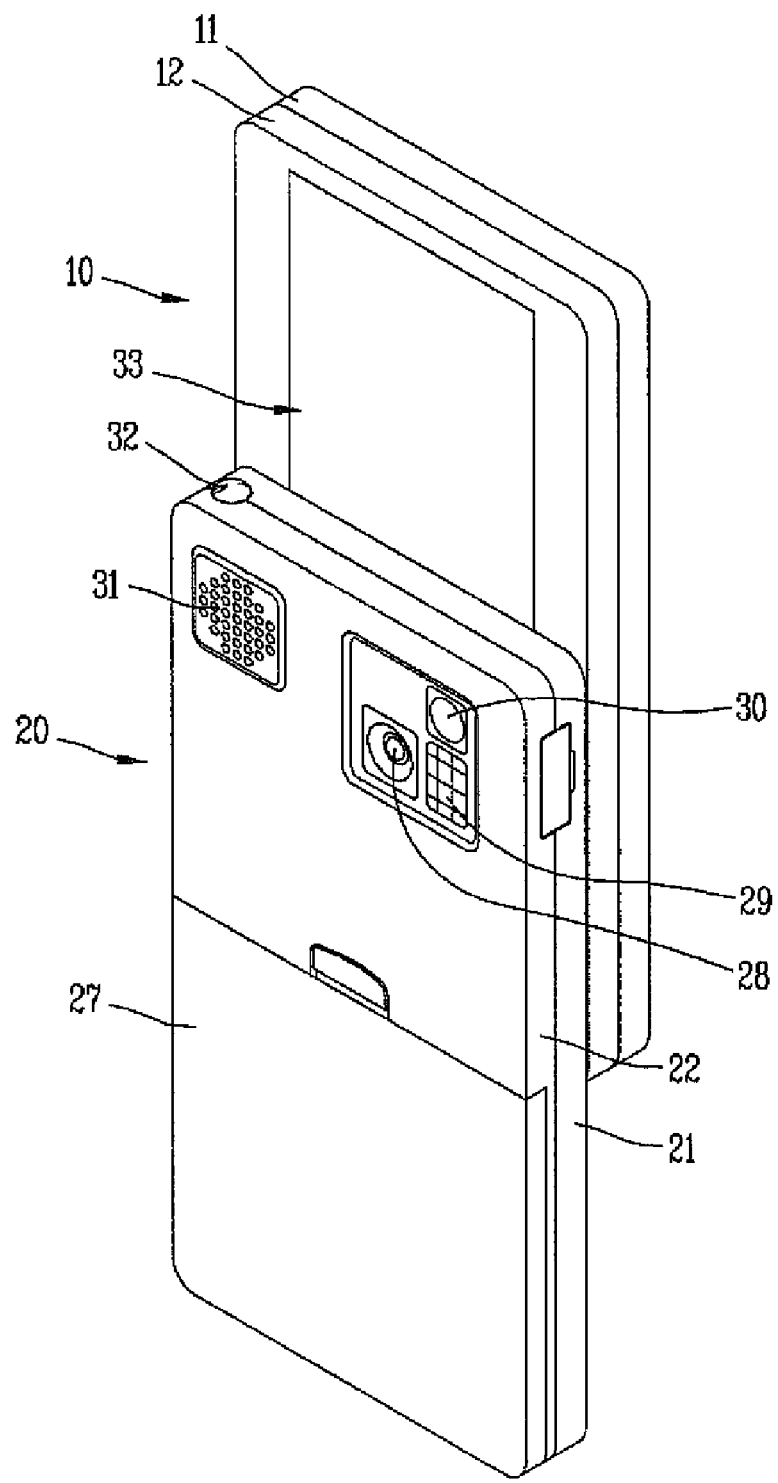
FIG. 2 is a rear perspective view of the mobile terminal of FIG. 1.

FIG. 2 is a rear perspective view of the mobile terminal according to one exemplary embodiment of the present invention. As shown in FIG. 2, a second image input unit 28 may be mounted on the rear surface of the rear case 22 of the second body 20. In this exemplary embodiment, the second image input unit 28 has an image capture direction which is substantially the opposite to that of the first image input unit 15 (see FIG. 1), and may have a different number of pixels (different resolution) from that of the first image input unit. For example, the first image input unit 15 may operate with a relatively lower resolution to capture the user face and transmit the same to the another party during video call communication or the like in which reverse link bandwidth capabilities may be limited, while the second image input unit 28 may operate with a relatively higher resolution to capture a general subject with a high picture quality. This high quality picture may not be immediately transmitted but may be later used for communicating to others.

A flash 29 and a mirror unit 30 are disposed adjacent to the second image input unit 28. When an image of the subject is captured with the second image input unit 28, the flash 29 illuminates the subject. The mirror unit 30 allows the user to see himself when he wants to capture his own image (self-image capturing) by using the second image input unit 28.

A second audio output unit 31 may be additionally disposed on the rear case 22. The second audio output unit 31 may implement a stereophonic function in conjunction with the first audio output unit (14 in FIG. 1), and may be also used for a call in a speaker phone mode.

A broadcast signal reception antenna 32 may be disposed at one side of the rear case 22, in addition to an antenna used for call communication. The antenna 32 may be installed such that it can be extended from the second body 20.

As shown in FIG. 2, one part of the slide module 33 that slidably connects the first body 10 to the second body 20 is located on the rear case 12 of the first body 10. The other part of the slide module 33 is located on the front case 21 of the second body 20, which is not be exposed, as shown in FIG. 2.

While the above description describes various components as being on either the first body 10 or the second body 20, the present invention is not limited to just the configuration shown. For example, one or more of the elements 28 to 32, which are disposed on the rear case 22 such as the second image input unit 28 in the above description, may be mounted on the first body 10, mainly, on the rear case 12. In this case, those elements disposed on the rear case 12 can be protected by the second body 20 in the closed configuration. In addition, even if the second image input unit 28 is not provided, the first image input unit 15 may be configured to rotate (or otherwise be moved) to allow image capturing in various directions.

Figure 3:
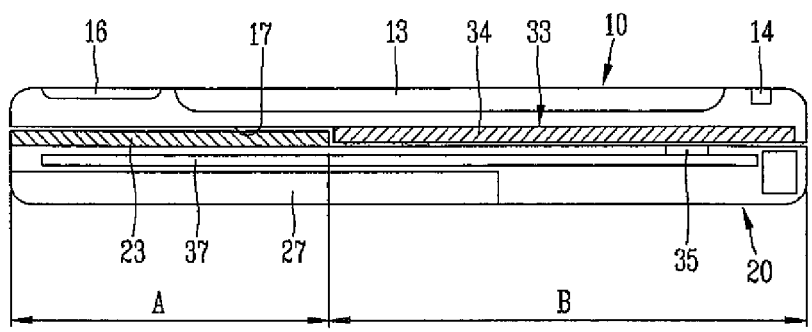
FIG. 3 is a schematic sectional view showing a closed configuration of the mobile terminal in FIG. 1.
Figure 4:
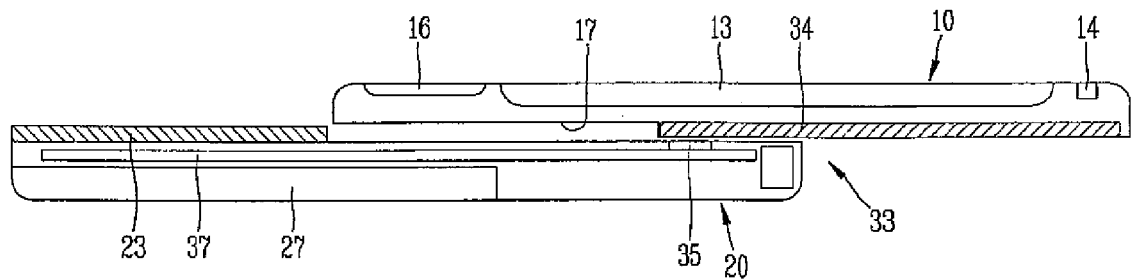
FIG. 4 is a schematic sectional view showing an open configuration of the mobile terminal in FIG. 1.

FIG. 3 is a schematic sectional view showing the closed configuration of the mobile terminal in FIG. 1 and FIG. 4 is a schematic sectional view showing the open configuration of the mobile terminal in FIG. 1. As shown in FIGS. 3 and 4, a circuitry supporting substrate, such as a printed circuit board (PCB) 37 is located in the second body 20. Various components (not shown) for electronically controlling the mobile terminal may be mounted to the PCB 37. Because the PCB 37 performs such control function, it can be also called a controller (see 40 in FIG. 7).

The slide module 33 includes a first slide member 34 mounted on the second surface of the first body, namely, on the surface of the rear case 12, and a second slide member 35 mounted on a first surface of the second body 20, namely, on the surface of the front case 21. The first and second slide members 34 and 35 are slidably connected. A biasing unit (not shown) for allowing the first body 10 to be biased by virtue of an elastic force or a magnetic force when the first body 10 is slidably moved may be mounted between the first and second slide members 34 and 35. The slide module 33 may have any suitable structure so long as it connects the first and second bodies 10 and 20 such that they are slidably moveable.

The slide module 33 is arranged so as not to overlap with the second manipulating unit 23. In other words, even in the closed configuration (as shown in FIG. 3), as well as in the open configuration, the slide module 33 does not overlap with the second manipulating unit 23. This allows the mobile terminal to become thinner in overall thickness compared to conventional mobile terminals.

In this exemplary embodiment, the second manipulating unit 23 may be located at a region (A) adjacent to one end portion of the mobile terminal along a lengthwise direction of the second body 20, and the slide module 33 may be located at a region (B) adjacent to the other end portion of the mobile terminal along the lengthwise direction. With this configuration, the slide module 33 may be disposed on the same level with the second manipulating unit 23 so that the manipulating unit 23 extends from the first surface of the second body 20 to substantially the same extent as the slide module 33 extends between the first and second bodies 10 and 20. As the second manipulating unit 23 extends from the second body 20, it may be on the same level with the first slide member 34 of the slide module 33. In addition, the second manipulating unit 23 is exposed in the open configuration to allow the user to manipulate it.

Figure 5:
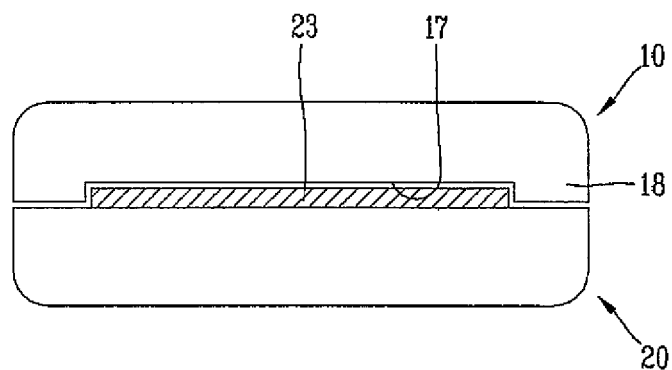
FIG. 5 is an elevation view of one end portion along a lengthwise direction of the mobile terminal in FIG. 3.

FIG. 5 is a side view of one end portion along a lengthwise direction of the mobile terminal in FIG. 3. As shown in FIG. 5, the first body 10 may include a receiving part 17 to receive the second manipulating unit 23 therein in the closed configuration. The receiving part 17 formed on the first body 10 may have such a form that its central portion is recessed and limited by a side edge portion. As shown, the first surface of the second body 20 faces the receiving part 17 to limit the size of the receiving part 17. In addition, the receiving part 17 is formed such that the receiving part 17 does not overlap the slide module 33.

Figure 6:
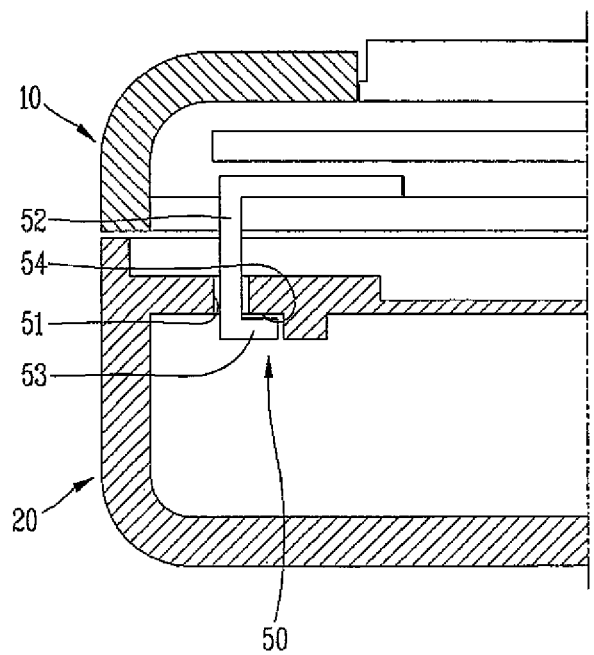
FIG. 6 is a partial schematic sectional view of the mobile terminal in FIG. 3.

FIG. 6 is a partial schematic sectional view of the mobile terminal in FIG. 3. As shown in FIG. 6, a gap maintaining unit 50 is provided at the first and second bodies 10 and 20 in order to maintain a gap in a certain range between the first and second bodies 10 and 20 when the first and second bodies 10 and 20 are slidably moved. The gap maintaining unit 50 serves to restrain widening of a gap between the first and second bodies 10 and 20 at the region (A), which would otherwise widen because the slide module 33 is mounted closer to one end of the mobile terminal in the region (B).

The gap maintaining unit 50 includes a guide rod 52 arranged to extend toward the second body 20 from the both side of the first body 10, particularly, from the edge portions (18 in FIG. 5), and a guide groove 51 formed in a lengthwise direction on the first surface of the second body 20 and allowing the guide rod 52 to be slidably moved therealong. A hook portion 53 is formed as a bent end portion of the guide rod 52 and is restrained by a stop portion 54 formed on an inner surface of the second body 20. Because the first and second bodies 10 and 20 are slidably moved while the hook portion 53 is restrained by the stop portion 54, the gap between the first and second bodies 10 and 20 is prevented from widening by more than a certain range. In this exemplary embodiment, the gap maintaining unit 50 is provided in the edge portions and does not overlap with the second manipulating unit 23.

Figure 7:
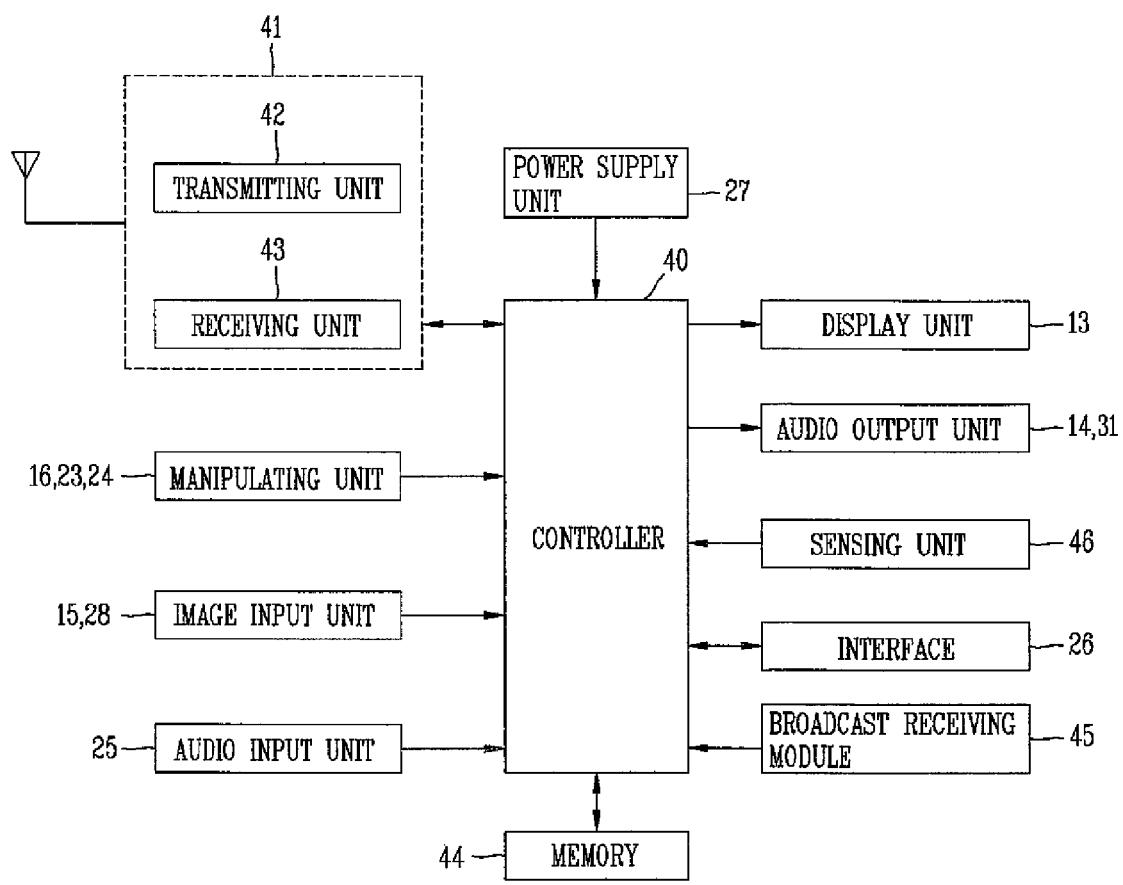
FIG. 7 is a schematic block diagram of the mobile terminal according to an exemplary embodiment of the present invention.

FIG. 7 is a schematic block diagram of the mobile terminal according to an exemplary embodiment of the present invention. With reference to FIG. 7, the mobile terminal according to an exemplary embodiment of the present invention includes a wireless communication module 41, manipulating units 16, 23 and 24, the image input units 15 and 28, the audio input unit 25, the display unit 13, the audio output units 14 and 31, a sensing unit 46, the interface 26, a broadcast receiving module 45, a memory 44, the power supply unit 27, and a controller 40. The controller 40 generally controls the general operation of the mobile terminal. For example, the controller 40 performs controlling and processing related to a voice call, data communication, a video call, or the like. In addition, the controller 40 may control other functions, such as those functions related to multimedia capabilities, of the mobile terminal.

The wireless communication module 41 transmits/receives radio signals to/from a mobile communication base station via an antenna. For example, the wireless communication module 41 handles transmission/reception of audio data, text data, video data, and control data under the control of the controller 40. The wireless communication module 41 also includes a transmitting unit 42 that modulates a signal to be transmitted and transmits the modulated signal and a receiving unit 43 that demodulates a received signal.

The manipulating units 16, 23 and 24 may be configured to provide key input data inputted by the user to the controller 40 to control the operation of the terminal. Each of the manipulating units 16, 23 and 24 may be formed as a dome switch, a touch pad (e.g., static pressure/capacitance), a jog wheel, a jog switch, and the like as note above.

The image input units 15 and 28 process an image frame such as a still image or video obtained by an image sensor during a video calling mode or in an image capturing mode. The processed image frame may be converted into image data that can be displayed on the display unit 13 and then outputted to the display unit 13. The image frame processed by the image input units 15 and 28 may be stored in the memory 44 or transmitted to the exterior via the wireless communication module 41 under the control of the controller 40.

The audio input unit 25 receives by a microphone an external audio signal in a calling mode, recording mode, voice recognition mode, etc., and processes it into electrical voice data. In case of the calling mode, the processed voice data may be converted for output into a format that can be transmittable to the mobile communication base station via the wireless communication module 41. In case of the recording mode, the processed voice data is outputted so as to be stored in the memory 44. The audio input unit 25 may include assorted noise canceling algorithms to cancel noise generated in the course of receiving the external audio signal.

The display unit 13 displays and outputs information processed in the mobile terminal. For example, when the mobile terminal is in a calling mode, the display unit 13 displays a User Interface (UI) or a Graphic User Interface (GUI) related to a call under the control of the controller 40. When the mobile terminal is in a video calling mode or an image capturing mode, the display unit 13 may display a captured/received image, UI, and/or a GUI under the control of the controller 40. If the display unit 13 includes a touch screen, the display unit 13 may be also used as an input unit as well as the output unit.

The audio output units 14 and 31 output audio data which has been received from the wireless communication module 41 in a call signal reception mode, a calling mode, a recording mode, a voice recognition mode, a broadcast reception mode, or the like, or output audio data which has been stored in the memory 44. In addition, the audio output units 14 and 31 output an audio signal related to a function (e.g., a call signal reception sound, a message reception sound, or the like.) performed by the mobile terminal. The audio output units 14 and 31 may include a speaker, a buzzer, or the like.

The sensing unit 46 senses a current state of the mobile terminal such as an opened or closed state of the mobile terminal, a location of the mobile terminal, or whether the mobile terminal is being touched or not by the user, and generates a sense signal for controlling the operation of the mobile terminal. For example, when the mobile terminal is a slide phone, the sensing unit 46 may sense whether the slide phone is opened or closed and output the sensing result to the controller 40 to control the operation of the terminal. In addition, the sensing unit 46 handles a sensing function as to whether or not the power supply unit 27 supplies power or whether or not the interface unit 26 is combined with an external device.

The interface 26 serves to interface with external devices to be connected with the mobile terminal. For example, the external devices may include a wired/wireless headset, an external charger, a wired/wireless data port, a card socket (e.g., for coupling a memory card, a SIM/UIM card), and the like. The interface 26 may receive data from the external device or be provided with power and transfer the received data or power to each element of the mobile terminal. The interface 26 may also transmit internal data of the mobile terminal to an external device.

The memory 44 may store a program for processing and controlling performed by the controller 40, and may also perform a function for temporarily storing inputted or outputted data (e.g., a phone book, a message, a still image, or video, or the like). In addition, the memory 45 may store a program for controlling an operation of the mobile terminal related to the present invention. The memory 44 may include a storage medium of at least one of a hard disk type memory, a card type memory (e.g., an SD or XD memory, or the like.), a flash memory, a RAM, or a ROM.

The broadcast receiving module 45 may receive a broadcast signal transmitted through a satellite or terrestrial waves, convert it into a broadcast data format that can be outputted to the display unit 13, and outputs the same to the controller 40. In addition, the broadcast receiving module 45 receives supplementary data (e.g., Electric Program Guide (EPG), a channel list, or the like) associated with a broadcast. The broadcast data converted in the broadcast receiving module 45 and the supplementary data may be stored in the memory 44.

The power supply unit 27 receives external or internal power and supplies power required for an operation of each element under the control of the controller 40.

As the exemplary embodiment of the mobile terminal may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A slidable mobile terminal comprising:
a first body having a first surface and a second surface;
a second body having a first surface and a second surface, the first body being movable with respect to the second body between a closed position where the first body substantially overlaps the second body and an open position where the first body partially overlaps the second body;
a slide module connecting the second surface of the first body to the first surface of the second body, the slide module allowing the first body to move between the closed position and the open position in a sliding direction; and
a manipulation unit located in the first surface of the second body, the manipulation unit being exposed when the first body is in the open position and the manipulation unit does not overlap the slide module in the closed position,
wherein the slide module includes:
a first slide member combined with the second surface of the first body; and
a second slide member combined with the first surface of the second body, the second slide member slidably connected to the first slide member, and
wherein the manipulating unit extends from the first surface of the second body to be substantially the same level of the first slide member.

2. A slidable mobile terminal comprising:
a first body having a first surface and a second surface;
a second body having a first surface and a second surface, the first body being movable with respect to the second body between a closed position where the first body substantially overlaps the second body and an open position where the first body partially overlaps the second body;
a slide module connecting the second surface of the first body to the first surface of the second body, the slide module allowing the first body to move between the closed position and the open position in a sliding direction;
a manipulation unit located in the first surface of the second body, the manipulation unit being exposed when the first body is in the open position and the manipulation unit does not overlap the slide module in the closed position; and
a gap maintaining unit located at a region between the first and second bodies where the slide module is not located, the gap maintaining unit preventing the gap between the first and second bodies at said region from being larger than a gap between the first and second bodies where the slide module is located.

3. The mobile terminal of claim 2, wherein the gap maintaining unit includes:
a guide groove provided in one of the first surface of the second body and the second surface of the first body, the guide groove extending along the sliding direction; and
a guide rod protruded from the other of the first surface of the second body and the second surface of the first body, the guide rod being slidably inserted in the guide groove so as to be caught by the body defining the one of the first surface of the second body and the second surface of the first body.

4. The mobile terminal of claim 3, wherein the guide rod includes a hook portion, and
wherein a stop portion is formed on the body defining the one of the first surface of the second body and the second surface of the first body, the hook portion slidably contacts with the stop portion.

* * * * *